US006725269B1

(12) United States Patent
Megiddo

(10) Patent No.: US 6,725,269 B1
(45) Date of Patent: Apr. 20, 2004

(54) SYSTEM AND METHOD FOR MAINTAINING MULTIPLE IDENTITIES AND REPUTATIONS FOR INTERNET INTERACTIONS

(75) Inventor: Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/453,140

(22) Filed: Dec. 2, 1999

(51) Int. Cl.[7] ............................................... G06F 15/16
(52) U.S. Cl. ...................................................... 709/228
(58) Field of Search ................................. 709/204, 205, 709/206, 207, 223, 224, 225, 227, 228, 229; 705/67, 65, 41

(56) References Cited

U.S. PATENT DOCUMENTS

| | | | |
|---|---|---|---|
| 5,848,396 A | | 12/1998 | Gerace ......................... 705/10 |
| 5,862,325 A | * | 1/1999 | Reed et al. ............. 395/200.31 |
| 5,923,845 A | * | 7/1999 | Kamiya et al. ......... 395/200.36 |
| 5,960,411 A | | 9/1999 | Hartman et al. .............. 705/26 |
| 5,966,705 A | | 10/1999 | Koneru et al. ................. 707/9 |
| 6,092,196 A | * | 7/2000 | Reiche ........................ 713/200 |
| 6,144,959 A | * | 11/2000 | Anderson et al. .............. 707/9 |
| 6,175,858 B1 | * | 1/2001 | Bulfer et al. ................ 709/206 |
| 6,374,359 B1 | * | 4/2002 | Shrader et al. ............. 713/201 |
| 6,421,729 B1 | * | 7/2002 | Paltenghe et al. .......... 709/229 |

OTHER PUBLICATIONS

Brad Harris and Bill Vernon, "The Big Guide to Netscape Communicator 4", 1997.*
Sympatico Help: Sympatico–Lycos Personalization: FAQ.*
"Stopping Cookies" Cookie Software (PC), printed from the Internet at http://www.cookiecentral.com/files.htm, Oct. 25, 1999, 5 pages.
"Cookies", printed from the Internet at http://www.cookie-central.com/cm002.htm, Dec. 2, 1999, 3 pages.
JavaScript Tip of the Week for Nov. 25, 1996: Everything You Ever Wanted to Know About Cookies, printed from the Internet at http://webreference.com/javascript/961125/part01.html, Dec. 2, 1999, 3 pages.

"What Went Wrong?", printed from the Internet at http://www.cookiecentral.com/cookie5.htm, Oct. 25, 1999, 2 pages.
"WebSite too big for its britches", Intranet World; p. 74a, Level 1–1 of 7 Stories, Copyright 1997 InfoWorld Media Group InfoWorld, Sep. 22, 1997, 3 pgs.
"Web publishing software; All–in–one Web solutions; A new generation of Windows products doesn't require you to be an expert programmer to create your own Web site. We look at three packages that let you get up and running with minimum technical knowledge", Product Comparison; p. 1, Level 1–2 of 7 Stories, Copyright 1996 InfoWorld Media Group InfoWorld, May 6, 1996, 29 pgs.

* cited by examiner

*Primary Examiner*—Glenton B. Burgess
*Assistant Examiner*—Kimberly Flynn
(74) *Attorney, Agent, or Firm*—Amin, Eschweiler; Marc D. McSwain

(57) ABSTRACT

A system and method is provided that allows a single user to maintain on the user's personal machine multiple identities for browsing on the Internet and establish multiple reputations corresponding to the multiple identities. The system includes a multiple identity browser that allows a user to create and select from amongst a plurality of identities. The multiple identity browser includes a list of free e-mail web sites for establishing e-mail addresses corresponding to the plurality of identities. The user can also create and store user names and passwords that the user utilizes at various web sites. An automatic cookie management module is provided that manipulates and stores cookie data sets corresponding to each of a plurality of identities in a multiple identity database module. The cookie management module sets the current cookie data set corresponding to the current identity set by the user in the multiple identity browser. The cookie management module also stores search history for each identity and sets the current search history to the current identity set by the user in the multiple identity browser.

4 Claims, 20 Drawing Sheets

MAIL CHECK LIST

| ENABLE | NAME | EMAIL | LOCATION |
|---|---|---|---|
| [x] | BOB | BOB@AOL.COM | AOL.COM |
| [ ] | BUYER | BUY@BUSINESS.COM | HOME |
| [x] | ZEUS | ZEUS@HOTMAIL.COM | HOTMAIL.COM |
| [ ] | SELLER | SEL@BUSINESS.COM | HOME |

APPLY    CANCEL

Fig. 9c

AUTOMATIC COOKIE MANAGEMENT MODULE OPERATION  ← 350

CURRENT IDENTITY: BOB

CURRENT COOKIE SET: COOKIE SET #1

CURRENT SEARCH HISTORY: SEARCH HISTORY SET #1

| IDENTITY NAME | IDENTITY HISTORY |
|---|---|
| BOB | COOKIE SET #1<br>SEARCH HISTORY #1 |
| BUYER | COOKIE SET #2<br>SEARCH HISTORY #2 |
| ZEUS | COOKIE SET #3<br>SEARCH HISTORY #3 |
| SELLER | COOKIE SET #4<br>SEARCH HISTORY #4 |

Fig. 11

SYSTEM AND METHOD FOR MAINTAINING MULTIPLE IDENTITIES AND REPUTATIONS FOR INTERNET INTERACTIONS

TECHNICAL FIELD

The present invention relates to an Internet browsing system and method, and more particularly to an Internet browsing system and method that provides a user with the ability to have multiple identities and establish different reputations for each identity on the Internet.

BACKGROUND OF THE INVENTION

Internet users routinely have to register at a site before they can access information and materials offered by that site. Web site operators can utilize this information for purposes that are not always in the best interest of the user. For example, news media sites can track the material accessed by individual readers and vendors can track the purchases of individual buyers. In some cases, the user may favor such tracking because it allows suppliers to direct to the user materials that the user would like to see or buy. However, in other cases the user may want to keep their identity private.

Related to the registration issue is the mechanism known as "cookies". Cookies were originally established to provide a simple mechanism for users to access their favorite web sites without having to go through the lengthy process of identifying themselves every time they visit. For instance, upon visiting a site, a user may be asked to reveal their name and perhaps some personal or financial information required to gain access to that site in the future. The site will then place a cookie or client identifier containing this information on your system. The user's identity may not be known to the web site operators, but the operators can still track the interactions of the user with the site by the identification information. This allows web site operators to track the movement of the user across the Internet and build detailed profiles of their interests, spending habits and lifestyles. Although most browsers now allow a user to approve or reject the requests for cookies, the process tends to be annoying and time consuming. Furthermore, when the user allows access through the cookie mechanism, there is the possibility that at some time later the user's identity may come about and the history of the user's browsing activity become associated with the user's true identity. Additionally, different web sites under different names may use information acquired through the cookies mechanism in one site with registration in another site, and associate the user with certain attributes that the user intended to keep private.

In electronic commerce applications participants have incentives to build a good reputation. Participants with better reputations avail themselves to more business. For example, the feedback mechanism implemented by ebay-.com helps buyers decide whether they are taking into account the past history of the seller. In other applications, sellers rely on credit history of buyers in deciding what prospective client will be acceptable. In some commerce applications, buyers get volume discounts so they have an incentive to identify themselves when involved in a business transaction. In all of the above transactions, the true identity of the business or individual may still be hidden but the reputations established via the "cookie" or some other user identification mechanism.

In certain electronic commerce transactions, some negotiation precedes an agreement on the price. Buyers may wish that information about place of residence, occupation, ethnicity, etc. is kept private, since such information may weaken the buyer's buying position to the seller if the seller is aware that a buyer may pay a higher price. Similarly, past history may weaken the buyer's bargaining position, so it would be better to hide such history during these transactions.

Accordingly, there is a strong need in the art for a system and/or method for an Internet user to establish multiple identities and multiple reputations corresponding to those identities from a single computer system.

SUMMARY OF THE INVENTION

According to a preferred embodiment of the present invention, a system and method is provided that allows a single user to maintain on the user's personal machine multiple identities for browsing on the Internet and establish multiple reputations corresponding to the multiple identities. The system includes a multiple identity browser that allows a user to create and select from amongst a plurality of identities. The multiple identity browser includes a list of free e-mail web sites for establishing e-mail addresses corresponding to the plurality of identities. The user can also create and store user names and passwords that the user utilizes at various web sites. An automatic cookie management module is provided that manipulates and stores cookie data sets corresponding to each of a plurality of identities in a multiple identity database module. The cookie management module sets the current cookie data set corresponding to the current identity set by the user in the multiple identity browser. The cookie management module also stores search history for each identity and sets the current search history to the current identity set by the user in the multiple identity browser.

In a preferred aspect of the invention, the system is provided with an e-mail receiving module. The e-mail receiving module allows a user to send, retrieve and view e-mail messages corresponding to different e-mail addresses associated with different identities. The user can choose to associate an e-mail address with a specific identity. chosen from amongst a plurality of free e-mail web sites. The e-mail receiving module can automatically look up a registered e-mail address located in free e-mail site, login to that site and retrieve and display that e-mail message without any interaction from the user. The system also includes a warning system that monitors the use of identities and provides the user with correct usages of identities in different sites and applications. The warning system can also inform a user if e-mail messages that are being sent have been sent by another identity, so that the integrity of each identity is maintained.

Thus, according to one aspect of the present invention, a system that provides a user with the ability to establish multiple identities while browsing on the Internet is provided. The system includes a multiple identity web browser module adapted to allow the user to establish multiple identities on a single client computer and an automatic cookie management module adapted to manipulate a plurality of cookie data sets corresponding to a plurality of established identities and set a current cookie data set to correspond to a current identity, such that a web site visited by the current identity has access only to the current cookie data set.

In accordance with another aspect of the present invention an Internet browsing methodology is provided. The methodology includes the steps of establishing a plurality of identities on a single computer, establishing a plurality of reputations corresponding to the plurality of identities by browsing activity on the Internet under each of the plurality of identities, each identity having a corresponding cookie data set and a corresponding search history, saving each of the cookie data sets and the search histories corresponding to each of the plurality of identities in a memory associated with the single computer, selecting a current identity from amongst the plurality of identities and setting a current cookie data set and a current search history with the cookie data set and the search history corresponding to the selected current identity.

In accordance with yet another aspect of the present invention, a method for browsing the Internet is provided. The browsing methodology includes the steps of establishing a plurality of identities on a single computer, establishing a plurality of e-mail addresses corresponding to the plurality of identities, at least one of the e-mail addresses located from a list of e-mail web sites, retrieving e-mail messages from the at least one of the e-mail addresses located from the list of e-mail web sites by providing e-mail login information to the site and transferring the e-mail message to the single computer and displaying the list of e-mail messages on the single computer.

In accordance with another aspect of the present invention an Internet browser system is provided. The system includes a computer adapted to be employed by a user for establishing multiple identities over the Internet. The computer provides access to one or more web sites for establishing a cookie data set for a chosen identity, wherein the computer is further operable to limit a web site access to the cookie data set associated with the current chosen identity selected by the user.

In accordance with yet another aspect of the present invention a server is provided that includes a processor, a memory coupled to the processor, and a network interface coupled to the processor for transmitting and receiving data with at least one remote computer system. An automatic cookie management module is stored in the memory. The automatic cookie management module is adapted to manipulate a plurality of cookie data sets corresponding to a plurality of established identities and set a current cookie data set to correspond to a current identity.

In accordance with yet another aspect of the present invention an electronic signal adapted to be transmitted between at least two computers is provided. The electronic signal includes an algorithm for selecting amongst a plurality of identities on the Internet. The algorithm provides a cookie data set corresponding to a chosen identity from the plurality of identities.

In accordance with yet another aspect of the present invention a system that provides a user with the ability to establish multiple identities while browsing on the Internet is provided. The system includes means for establishing a plurality of identities on a single client computer and means for manipulating a plurality of cookie data sets corresponding to the plurality of established identities and setting a current cookie data set to correspond to a current identity, such that a web site visited by the current identity has access only to the current cookie data set.

In accordance with still yet another aspect of the present invention, a system that provides a user with the ability to establish multiple identities while browsing on the Internet is provided. The system includes a multiple identity web browser module adapted to allow the user to establish multiple identities on a single client computer, an automatic cookie management module adapted to manipulate a plurality of cookie data sets corresponding to a plurality of established identities and set a current cookie data set to correspond to a current identity, such that a web site visited by the current identity has access only to the current cookie data set, an e-mail receiving module adapted to display e-mail messages from e-mail addresses corresponding to the plurality of established identities and a multiple identity database module adapted to store cookie data sets and search history data corresponding to each of the plurality of established identities.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

BRIEF DESCRIPTION OF THE DRAWINGS

FIG. 9c illustrates a "Mail Check List" screen in accordance with one aspect of the present invention;

FIG. 11 illustrates operation of an automatic cookie management module in accordance with one aspect of the present invention;

DETAILED DESCRIPTION OF THE INVENTION

Figure 1A:
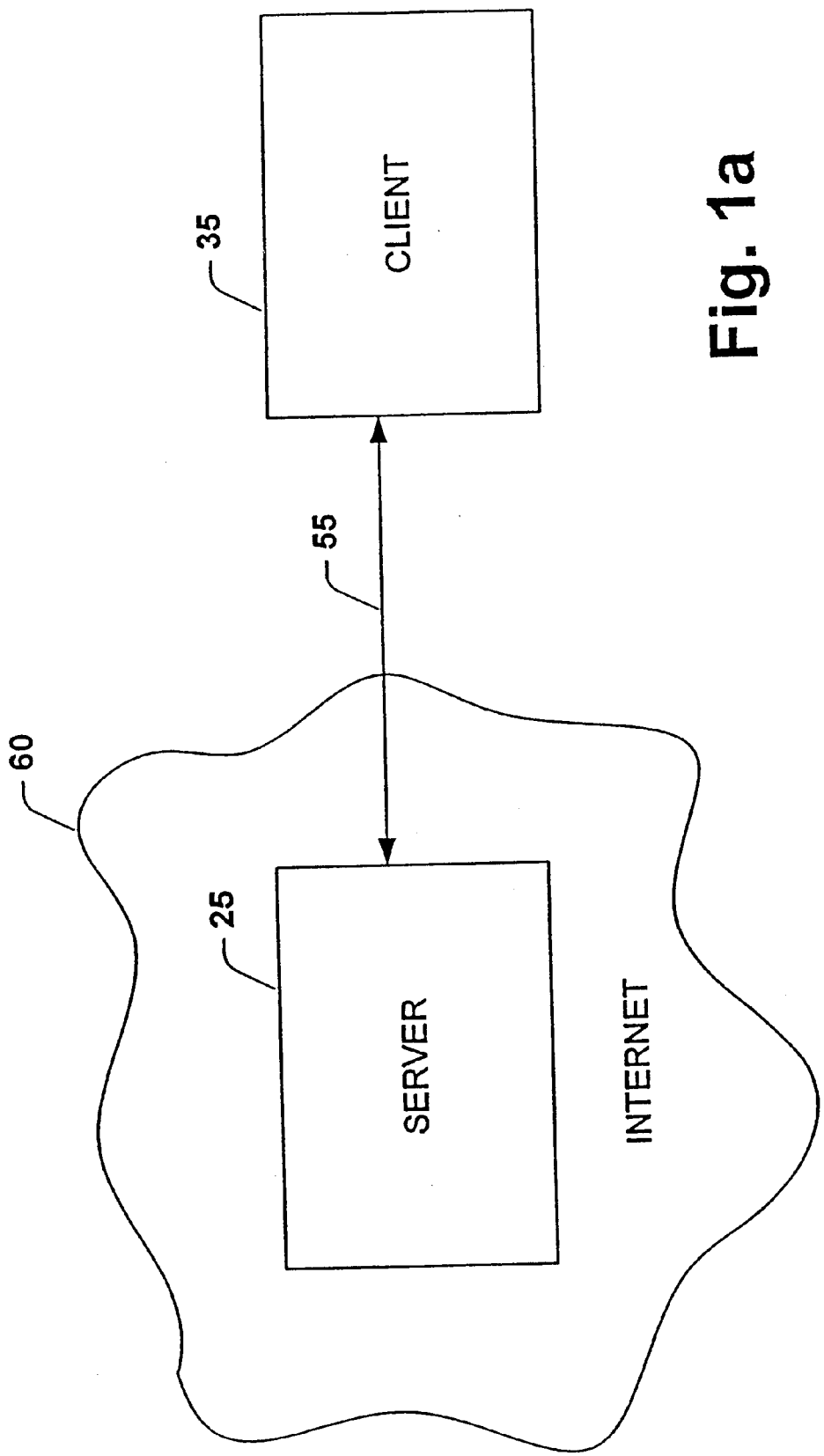
FIG. 1a is a schematic illustration of a client computer operatively coupled to a server computer system in accordance with one aspect of the present invention.

The present invention is now described with reference to the drawings, wherein like reference numerals are used to refer to like elements throughout. The present invention is described with reference to a system and method for establishing multiple identities on the Internet and maintaining those identities on a single computer system. It should be understood that the description of these embodiments are merely illustrative and that they should not be taken in a limiting sense.

FIG. 1a illustrates a schematic block diagram that depicts an environment of interest to a preferred embodiment of the present invention. A client computer system 35 is shown connected to a central server computer system 25 that is part of the Internet 60. The client computer system 35 and server 25 are connected via an Internet connection 55 using a public switched phone network, for example, such as those provided by a local or regional telephone operating company. The Internet connection 55 may also be provided by dedicated data lines, Personal Communication Systems ("PCS"), microwave, or satellite networks, for example, or any suitable means. It is to be understood that the terms client and server are to be construed in the broadest sense, and that all such constructions of the terms are intended to fall within the scope of the hereto appended claims. It is also to be understood that the term computer system is to be construed in the broadest sense and can include such systems as a dummy computer terminal connected to the Internet, a hand held portable device connected to the Internet or a television system connected to the Internet.

Figure 1B:
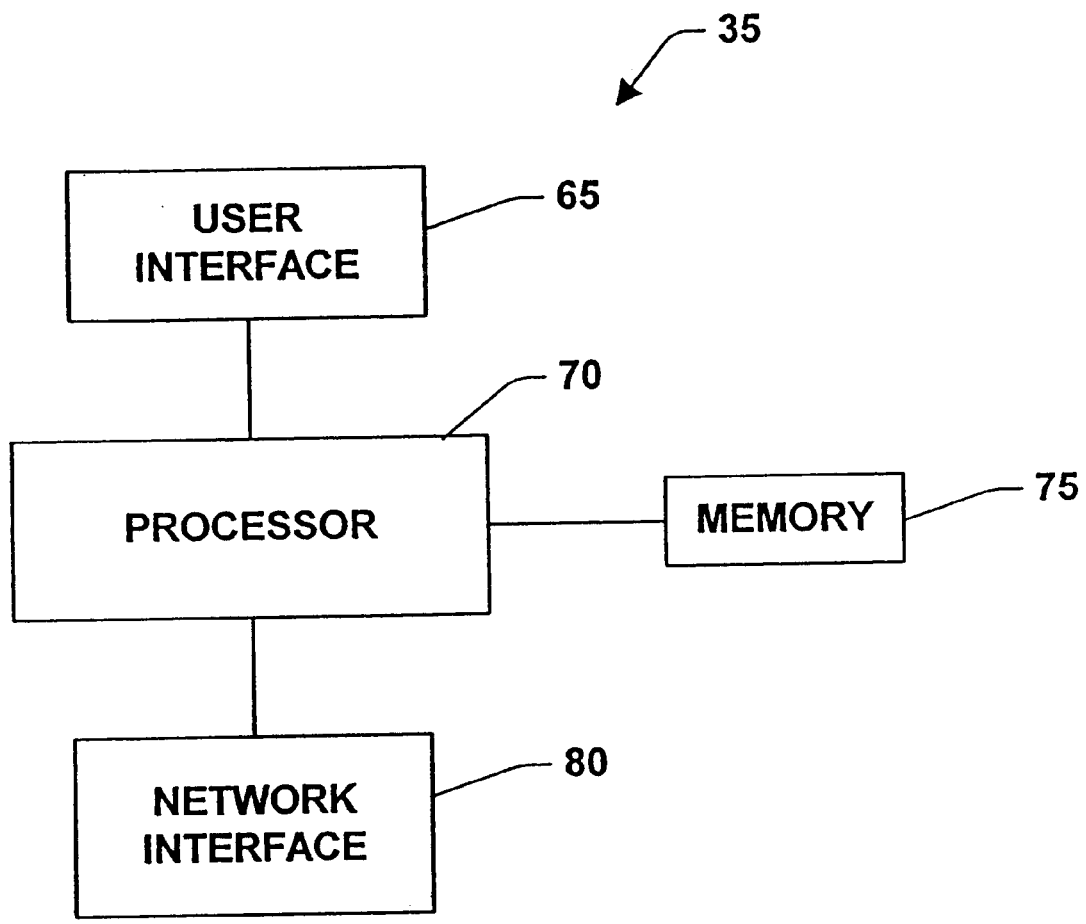
FIG. 1b illustrates a block diagram of a client computer in accordance with one aspect of the present invention.

Turning now to FIG. 1b, a block diagram of the hardware components of the client computer 35 is shown. In particular, the client computer 35 includes a central processor 70 for performing the various functions described herein. A memory 75 is coupled to the processor 70 and stores operating code and other data associated with the operations of the client computer 35. A user interface 65 is also coupled to the processor 70 and provides an interface through which the client computer 35 may be directly programmed or accessed. The user interface 65 may, for example, may be an alphanumeric keyboard and mouse. A network interface 80 coupled to the processor 70 provides multiple connections for transceiving information with various Internet sites over network cables (not shown).

Figure 2:
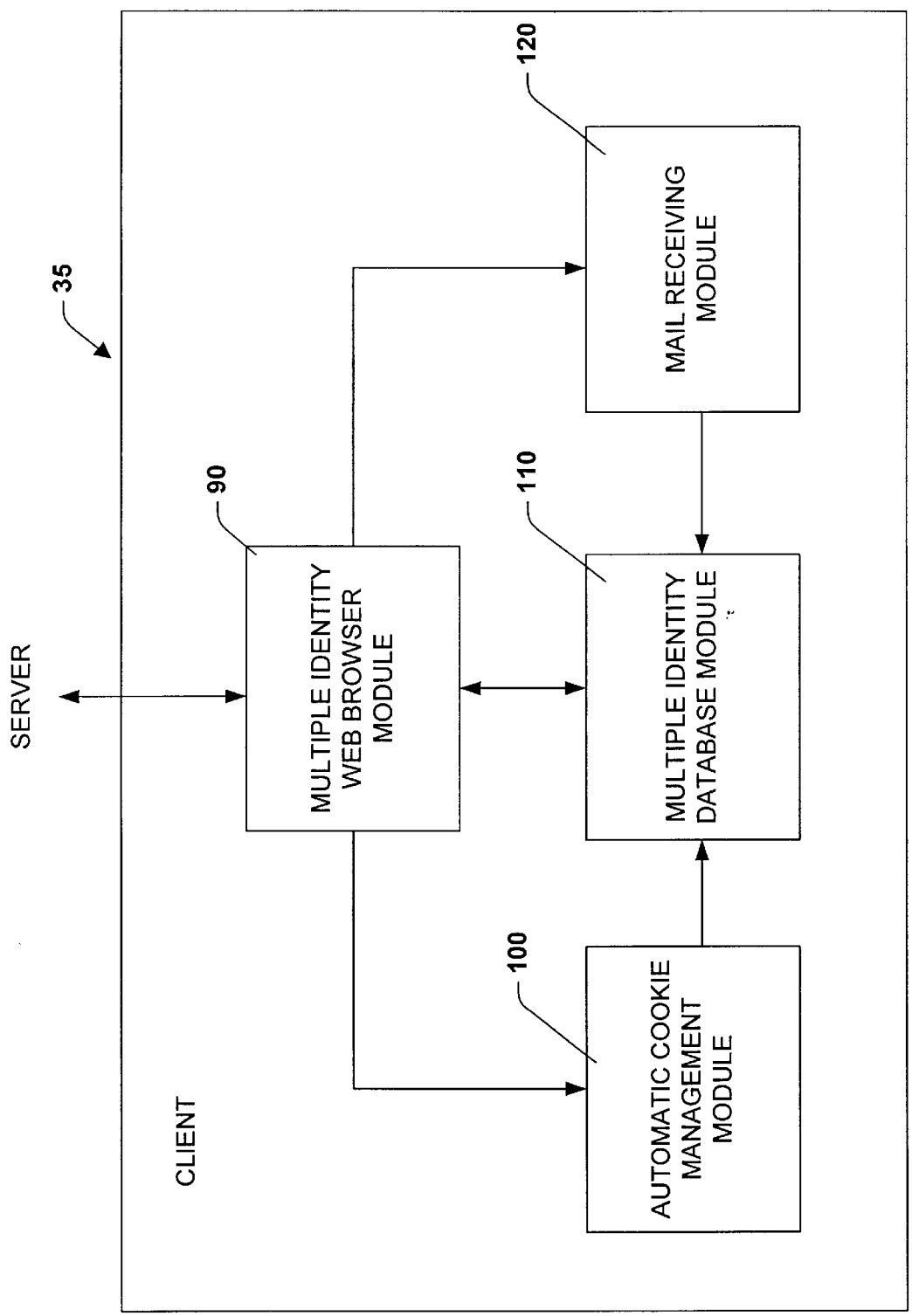
FIG. 2 is a schematic illustration of the present invention residing on the client computer in accordance with one aspect of the present invention.

Turning now to FIG. 2, the client computer 35 includes a multiple identity browser module 90, an automatic cookie management module 100, a multiple identity database module 110 and a mail receiving module 120. The multiple identity web browser module 90 interfaces with the server 25 and ultimately the Internet 60. The multiple identity web browser module 90 operates as any typical Internet browser storing current search history data and receiving cookie data from certain Internet sites, which it stores in its multiple identity database module 110. However, when the user changes identity, the automatic cookie management module stores the search history data and the cookie data for the previous identity and updates the current search history data and the cookie data to reflect the new identity, so that subsequently visited outside sites are no longer aware of the previous identity, but only the new identity. The mail receiving module 120 allows a user to access and send e-mail messages through a variety of different identities and e-mail addresses associated with these identities. Preferably, the modules are software programs stored in the memory 75, which interface with both the Internet 60 and the operating system residing on the client computer 35.

The present invention may be implemented via object oriented programming techniques. In this case each component of the system could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

The present invention can employ abstract classes, which are designs of sets of objects that collaborate to carry out a set of responsibilities. Frameworks are essentially groups of interconnected objects and classes that provide a prefabricated structure for a working application. It should also be appreciated that the automatic cookie management module 100 and the mail receiving module 120 could be implemented utilizing hardware and/or software, and all such variations are intended to fall within the appended claims included herein.

Figures 3A, 3B:
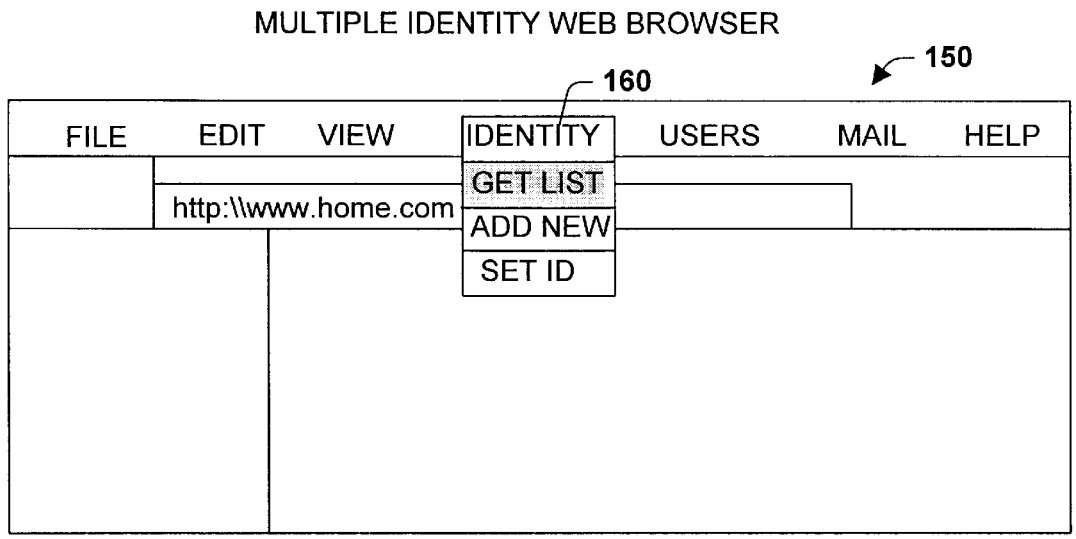
FIG. 3a illustrates a multiple identity browser providing an "Identity" menu with a "Get List" option in accordance with one aspect of the present invention.
FIG. 3b illustrates an "Identity List" screen in accordance with one aspect of the present invention.
Figure 3C:
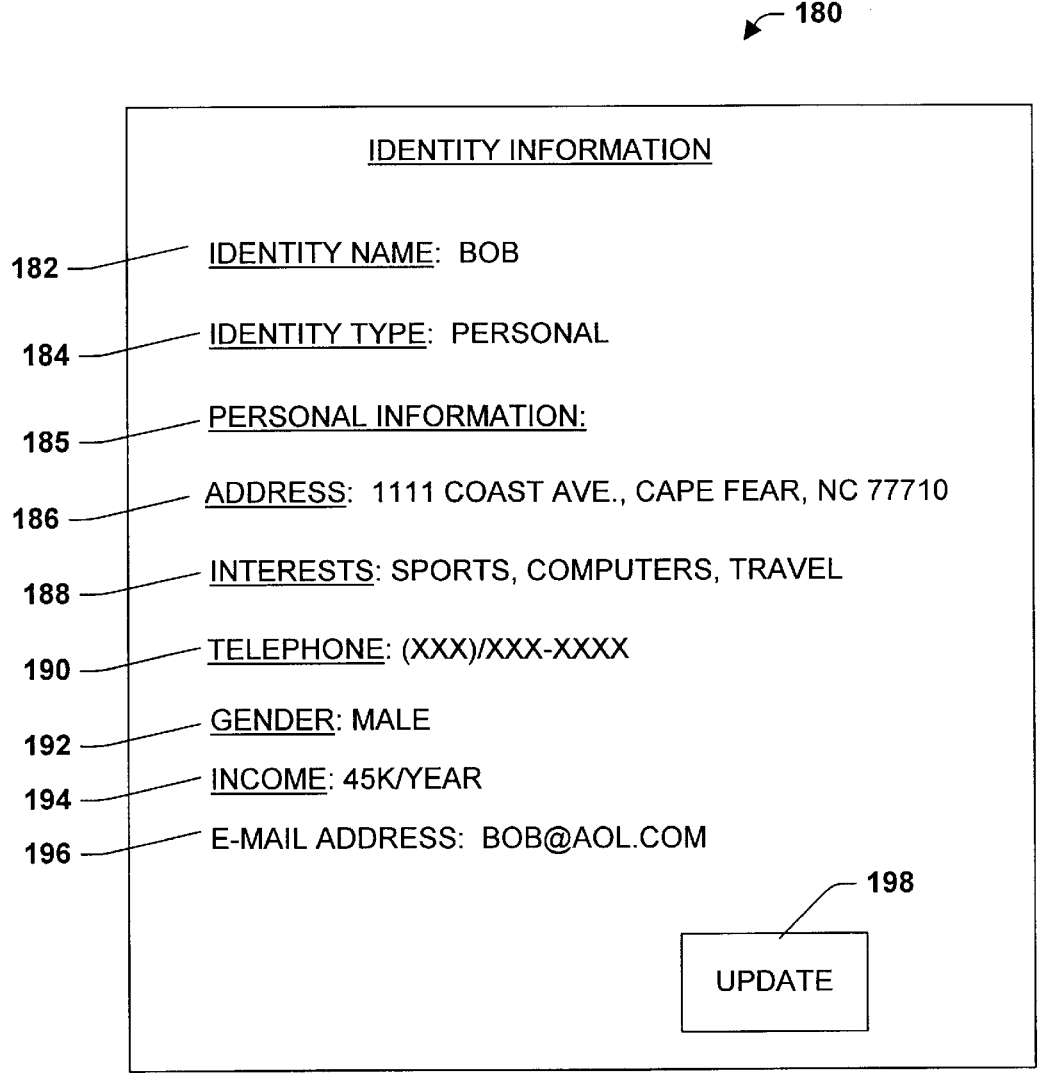
FIG. 3c illustrates an "Identity Information" screen in accordance with one aspect of the present invention.

Turning now to FIG. 3a, in accordance with one embodiment of the present invention, a multiple identity browser 150 generated by the multiple identity web browser model 90 is illustrated and includes a menu option labeled as "Identity" 160. A user can select the "Identity" menu option and select the "Get List" selection, for example, by highlighting it and clicking with the computer mouse (not shown) or other type pointing or selection device. In response, an "Identity List" menu 170 will pop up, such as that illustrated in FIG. 3b. The "Identity List" menu 170 will include all of the current identity names 172 in the system, the e-mail address 174 associated with that identity name, and the type of identity 176 (e.g. personal, business, anonymous) associated with the identity name. A user may delete an identity from the list by highlighting the identity with the mouse and clicking on the "Delete Identity" button 179. A user may update the identity information by highlighting the identity with the mouse and clicking on the "Update Identity" button 178 to reveal the "Identity Information" menu 180 as illustrated in FIG. 3c. The user can change any of the identity information and update this information by clicking on the "Update" button 198 with the computer mouse. The identity information for this example includes: identity name 182, identity type 184, optional personal information 185, such as address 186, interests 188, telephone 190, gender 192, and income 194, and finally, the e-mail address 196 the user wants associated with the identity name.

Figures 4A, 4B:
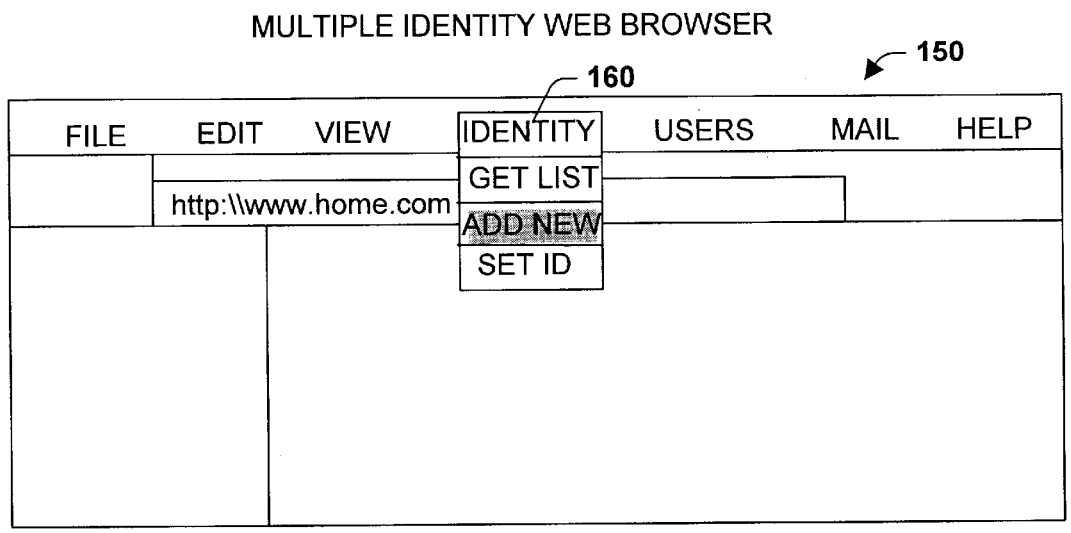
FIG. 4a illustrates a multiple identity browser providing an "Identity" menu with an "Add New" option in accordance with one aspect of the present invention.
FIG. 4b illustrates an "Enter New Identity Information" screen in accordance with one aspect of the present invention.

FIG. 4a illustrates the user selecting the "Identity" menu option 160 and selecting the "Add New" selection by for example highlighting it and clicking with the computer mouse. An "Enter New Identity Information" menu 200 will pop up, such as that illustrated in FIG. 4b. The user can enter the identity information and enter this information into the system by clicking on the "Enter" button 218 with the computer mouse. The identity information for this example includes: identity name 202, identity type 204, optional personal information 206, such as address 208, interests 210, telephone, gender 212, and income 214, and finally, the e-mail address 216 the user wants associated with the identity name. Importantly, the user may click on the default box to use the default e-mail address set up in the system, as will be described in greater detail later. The user may click on the user specific box and enter an e-mail address in the box below. Finally, the user may click on the free list box and select from a list 217 of free e-mail web sites. If the user chooses from the free list box and chooses from the list 217 of free e-mail web sites, the system will contact the site and begin the registering process after the user clicks on the "Enter" button 218.

Figure 5A:
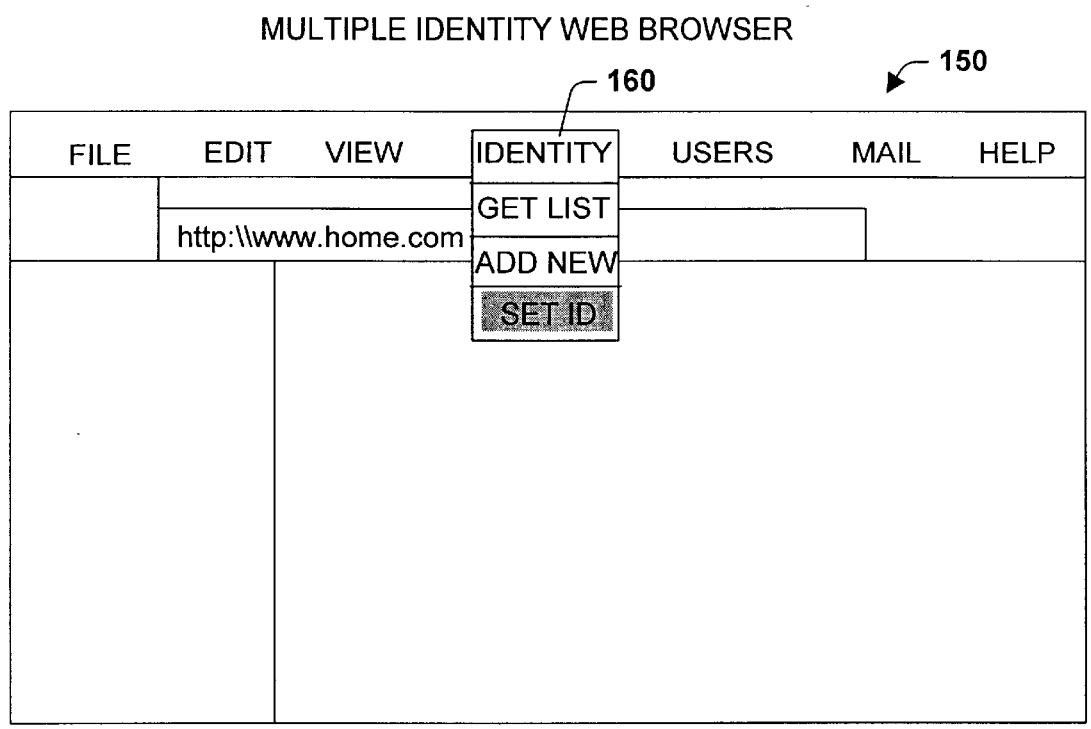
FIG. 5a illustrates a multiple identity browser providing an "Identity" menu with a "Set Id" option in accordance with one aspect of the present invention.
Figure 5B:
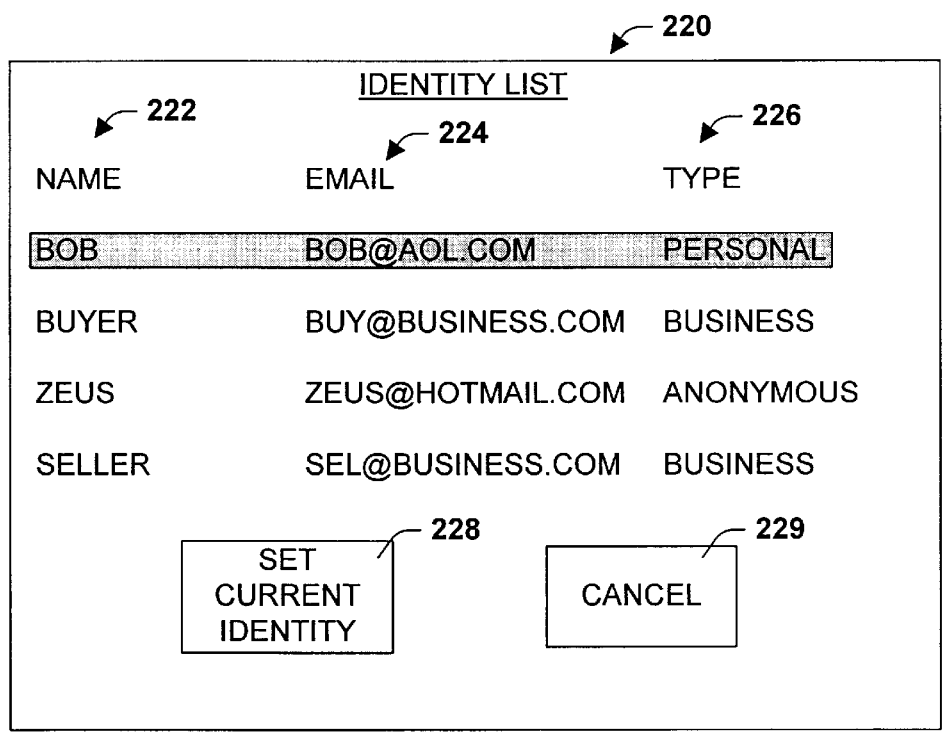
FIG. 5b illustrates an "Identity List" screen for setting the current identity in accordance with one aspect of the present invention.

FIG. 5a illustrates the user selecting the "Identity" menu option 160 and selecting the "Set Id" selection by highlighting it and clicking with the computer mouse. An "Identity List" menu 220 will pop up, such as that illustrated in FIG. 5b. The "Identity List" menu 220 will include all of the current identity names 222 in the system, the e-mail address 224 associated with that identity name, and the type of identity 226 (e.g. personal, business, anonymous) associated with the identity name. A user may select an identity for the current session or change the identity for the current session from the list by highlighting the identity with the mouse and clicking on the "Set Current Identity" button 228. A user may keep the current identity by clicking on the "Cancel" button 229 or clicking the back button (not shown) on the browser.

In a preferred aspect of the invention, a user may want to keep track of all the user names and passwords that a user obtains at various Internet sites where the user registers. Due to the fact that the user may register at different sites or at the same sites under different identities, keeping track of all the user names and passwords can become cumbersome. In addition, the user may want to keep track of the transactions and interaction history occurring at different sites under different identities and under different user names, so that the user can maintain a consistent reputation for a given identity.

Figure 6A:
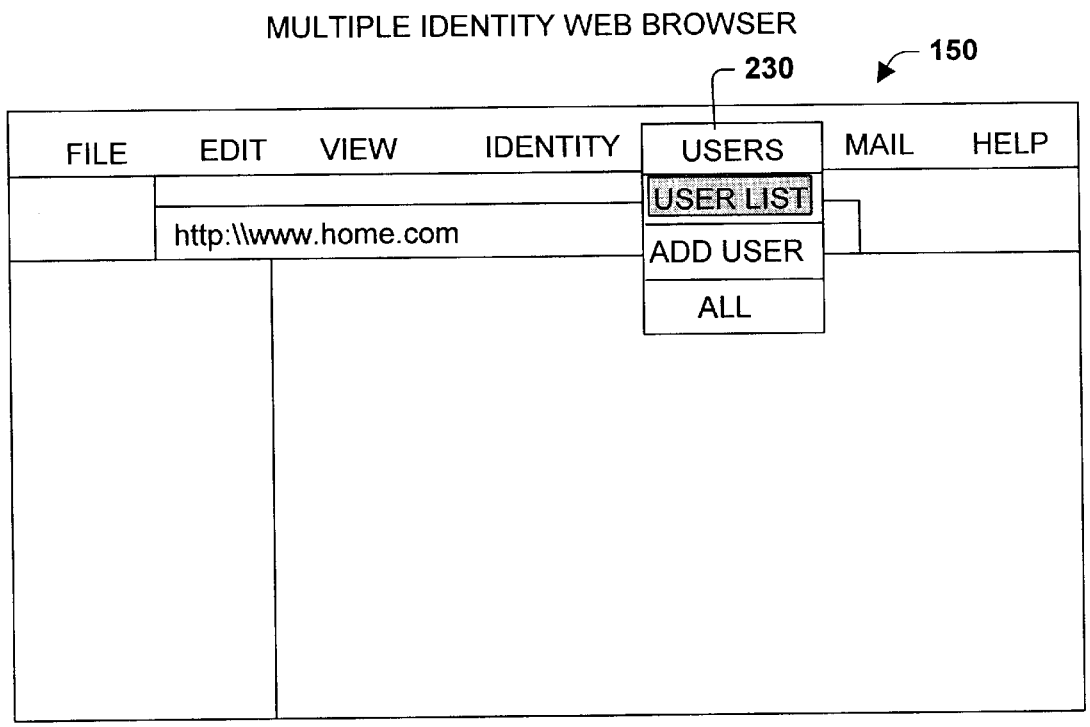
FIG. 6a illustrates a multiple identity browser providing a "Users" menu with a "Users List" option in accordance with one aspect of the present invention.
Figure 6B:
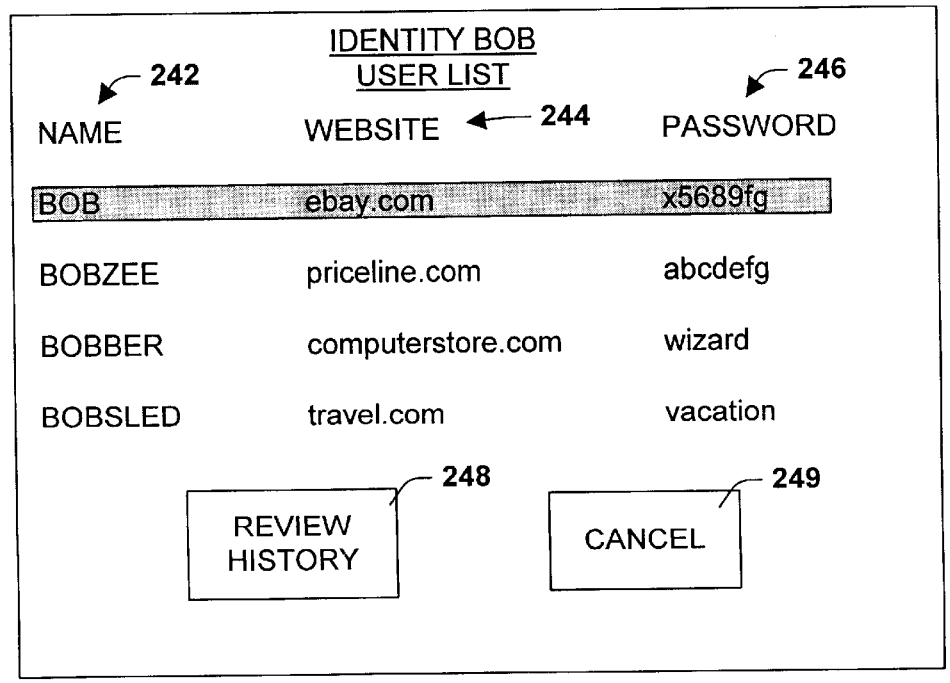
FIG. 6b illustrates an "Identity Users List" screen in accordance with one aspect of the present invention.
Figure 6C:
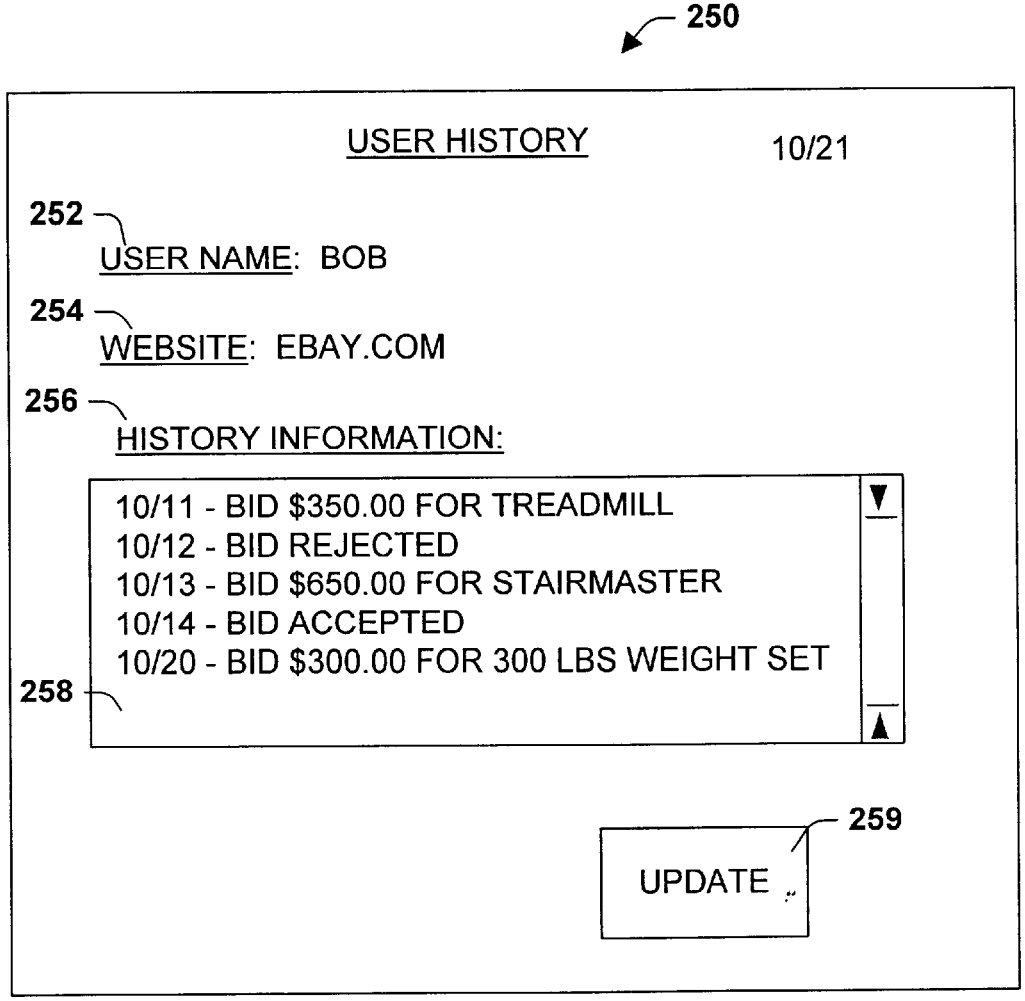
FIG. 6c illustrates a "Users History" screen in accordance with one aspect of the present invention.

Turning now to FIG. 6a, in accordance with one embodiment of the present invention, the multiple identity browser 150 is illustrated that includes a menu option labeled as "Users" 230. A user can select the "Users" menu option and select the "User List" selection, for example, by highlighting it and clicking with the computer mouse. A "User List" menu 240 will pop up, such as that illustrated in FIG. 6b. The "User List" menu 240 will include all of the current user names 242 in the system for the identity currently set in the system, the web site address 244 associated with that user name that the user has registered under using the current identity, and the password 246 associated with the user name and the web site. The operator may exit the box by clicking on the "Cancel" button 249 or clicking the back button (not shown) on the browser. An operator may review the history associated with transactions performed under the user name and the web site by highlighting the user name with the mouse and clicking on the "Review History" button 248 to reveal the "User History" window 250 as illustrated in FIG. 6c. The user can change the history information and update this information by clicking on the "Update" button 259 with the computer mouse. The history information for this example includes: user name 252, web site 254, and history information 256. The history information 256 includes a series of history transactions located in a scroll down window 258 that can be modified, added to and deleted from the history information 256.

Figure 7A:
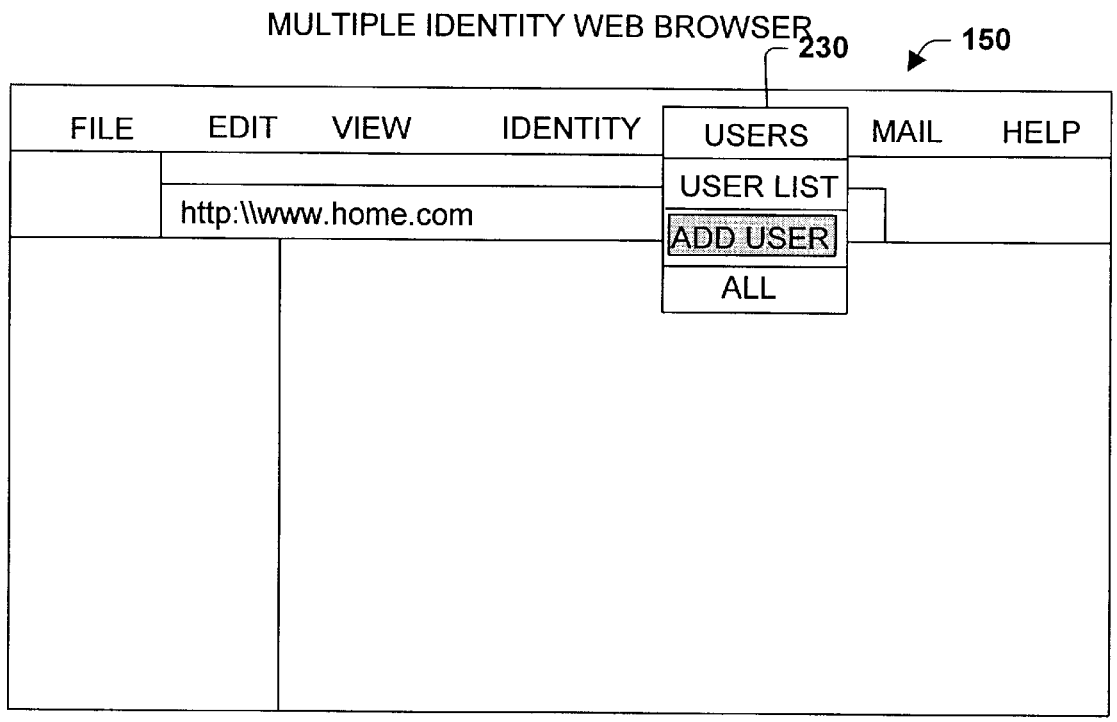
FIG. 7a illustrates a multiple identity browser providing a "Users" menu with a "Add User" option in accordance with one aspect of the present invention.
Figure 7B:
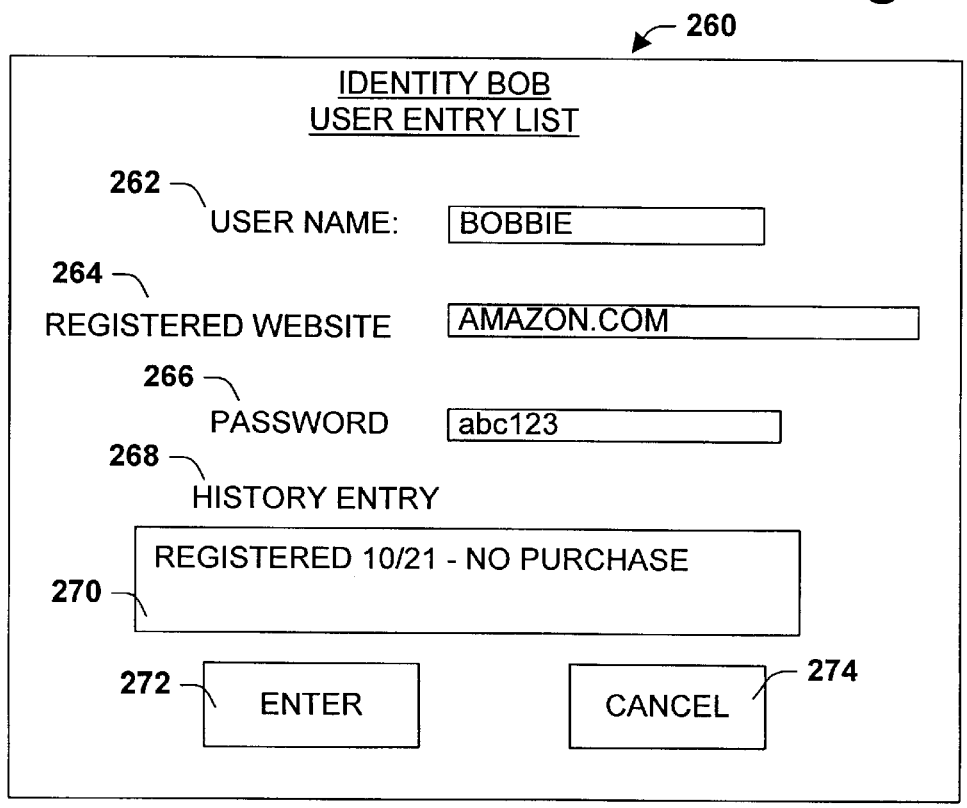
FIG. 7b illustrates an "Identity User Entry List" screen in accordance with one aspect of the present invention.

FIG. 7a illustrates the user selecting the "Users" menu option 230 and selecting the "Add User" selection by highlighting it and clicking on it with the computer mouse. A "User List Entry" menu 260 will pop up, such as that illustrated in FIG. 7b. The "User List Entry" menu 260 will include entry fields for the following: user name 262, registered web site 264, password 266, history entry 268 and associated input window 270. The user can enter the user information and enter this information into the system by clicking on the "Enter" button 272 with the computer mouse. A user may cancel the current user entry by clicking on the "Cancel" button 274 or clicking the back button (not shown) on the browser. The operator may review a list of all users for all identities by selecting the "Users" menu option 230 and selecting the "All" selection by highlighting it and clicking with the computer mouse.

In another preferred aspect of the invention, the mail receiving module 120 provides the user with the ability to send, receive and view e-mail from any of the e-mail addresses associated with any of the identities. This is advantageous to the user because the user can determine e-mail that the user sent or received under different identities at the same time, so that the user can customize e-mails and receive certain e-mail types, thus enhancing the reputation of a particular identity. Furthermore, reviewing e-mail from all identities at the same time facilitates the ease of use and speed that the user can conduct transactions. The user may choose to view only certain e-mail accounts or choose to review a check list of user accounts, so that the user can more readily decide what e-mail account and identity is appropriate for a given transaction.

Figure 8A:
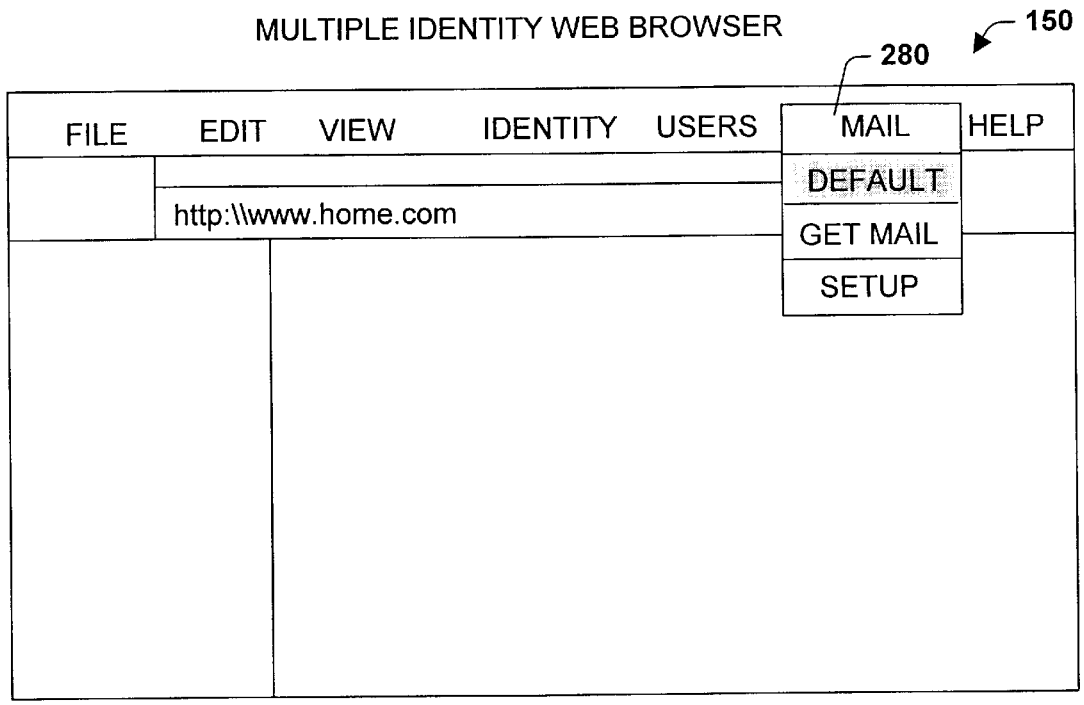
FIG. 8a illustrates a multiple identity browser providing a "Mail" menu with a "Default" option in accordance with one aspect of the present invention.
Figure 8B:
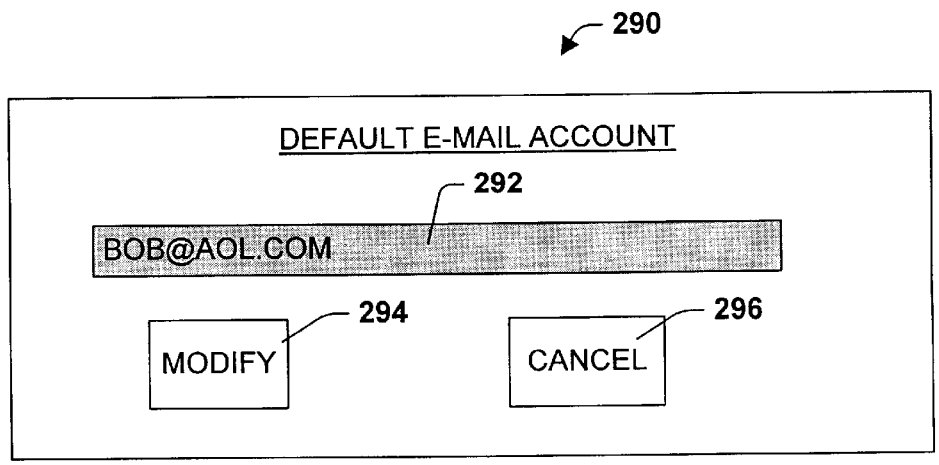
FIG. 8b illustrates a "Default E-Mail Account" screen in accordance with one aspect of the present invention.

Turning now to FIG. 8a, in accordance with one embodiment of the present invention, the multiple identity browser 150 is illustrated that includes a menu option labeled as "Mail" 280. A user can select the "Mail" menu option and select the "Default" selection, for example, by highlighting it and clicking with the computer mouse. A "Default E-mail Account" menu 290 will pop up, such as that illustrated in FIG. 8b. The "Default E-mail Account" menu 290 will include the current default e-mail address for the system. This is the address that will be associated with each identity unless the operator specifies otherwise. The operator may modify the default address by updating it in the window 292 and clicking on the "Modify" button 294 or leave the default e-mail address by clicking on the "Cancel" button 296.

Figure 9A:
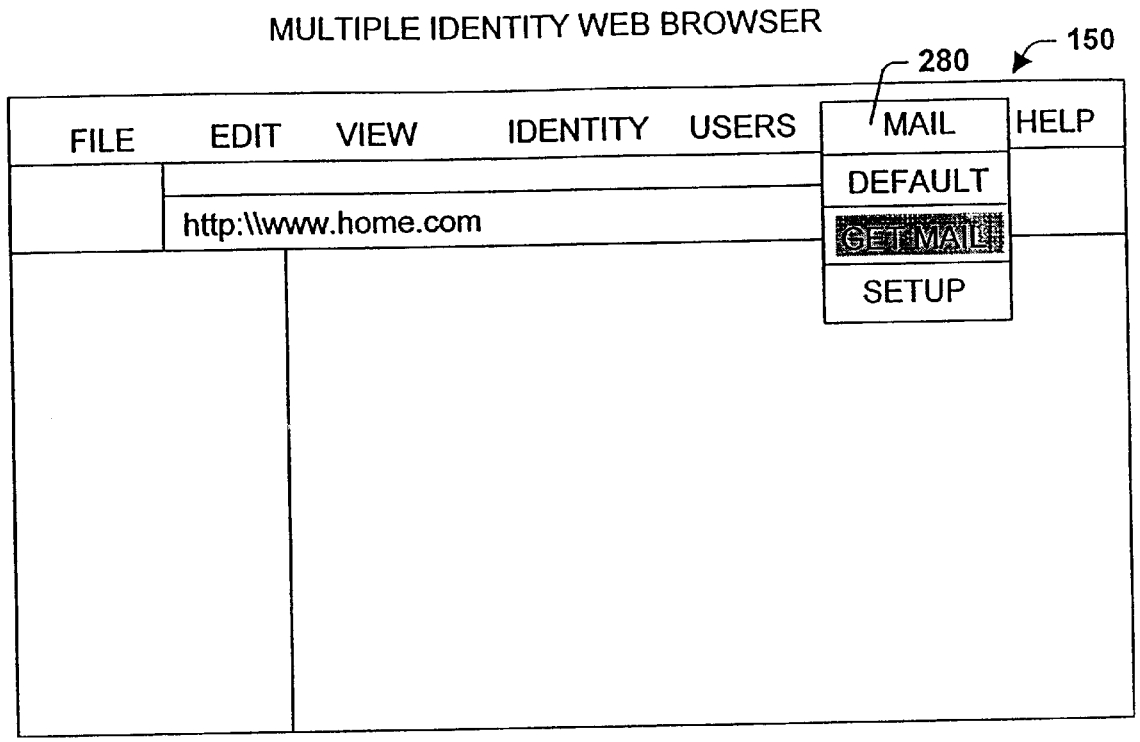
FIG. 9a illustrates a multiple identity browser providing a "Mail" menu with a "Get Mail" option in accordance with one aspect of the present invention.
Figure 9B:
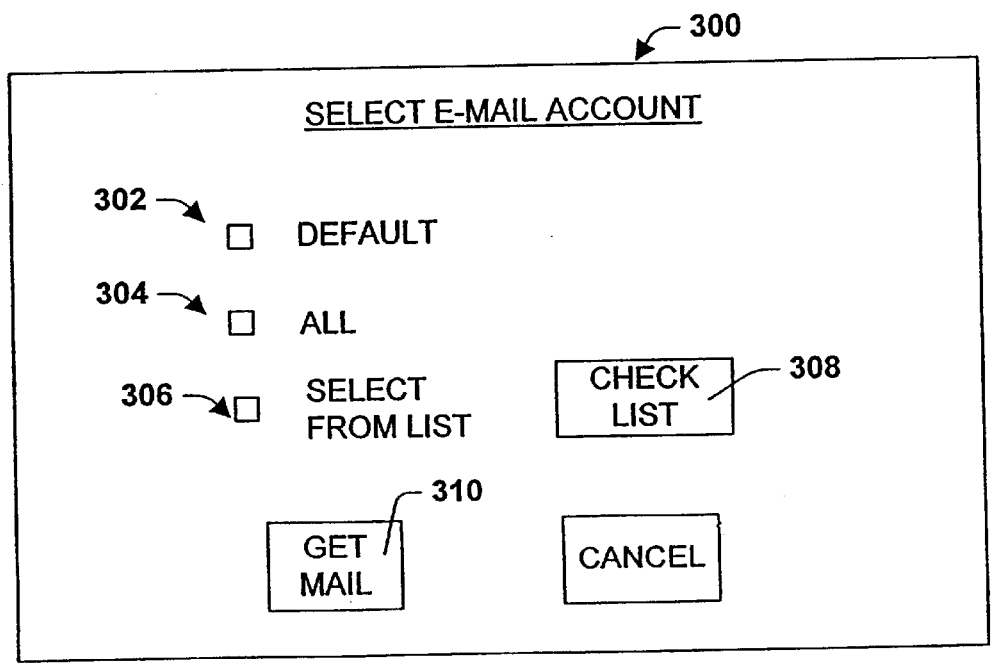
FIG. 9b illustrates a "Select E-Mail Account" screen in accordance with one aspect of the present invention.

FIG. 9a illustrates the user selecting the "Mail" menu option 280 and selecting the "Get Mail" selection by highlighting it and clicking with the computer mouse. A "Select E-mail Account" menu 300 will pop up, such as that illustrated in FIG. 9b. The "Select E-mail Account" menu 300 will include check box 302 for selecting the default e-mail address, the check box 304 for selecting all the e-mail addresses for all the identities and a check box 306 to select from the list of all the e-mail addresses for all the identities. The operator can get mail by clicking on the "Get Mail" button 310, and the e-mail that will be viewed will depend on which of the e-mail addresses were selected (from selections 302, 304 and 306). The operator can check the list of available e-mail addresses by user identity by clicking on the "Check List" box 308. A "Mail Check List" menu 320 will then pop up, such as that illustrated in FIG. 9c. The "Mail Check List" menu 320 includes an enable check box 322, an identity name 324, an e-mail address 326 and an e-mail address location 328. The operator can enable specific identities and corresponding e-mail addresses by clicking on the e-mail enable check box 322 for that particular identity name and then clicking on the "Apply" button 327. If the operator is satisfied with the current selection, the operator may exit the "Mail Check List" menu by clicking on the "Cancel" button 329.

Figures 10A, 10B:
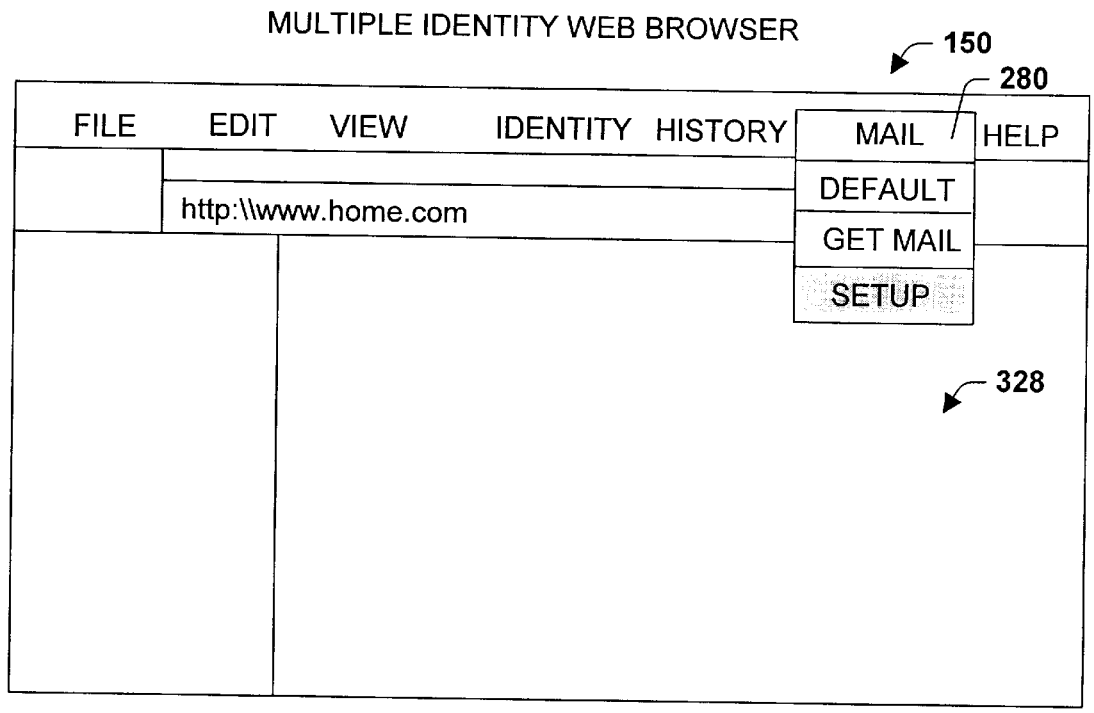
FIG. 10a illustrates a multiple identity browser providing a "Mail" menu with a "Setup" option in accordance with one aspect of the present invention.
FIG. 10b illustrates a "Setup New E-Mail Account" screen in accordance with one aspect of the present invention.

FIG. 10a illustrates the user selecting the "Mail" menu option 280 and selecting the "Setup" selection by highlighting it and clicking with the computer mouse. A "Setup New E-mail Account" menu 330 will pop up, such as that illustrated in FIG. 10b. The "Setup New E-Mail Account" menu 330 will include the following: identity name 332, identity type 334, the e-mail setup information 336, such as e-mail address 338, e-mail access location 340, e-mail login 342, e-mail password 344 and whether access 346 is to be performed at login or at a "Get Mail" command. Once the information is entered, the new e-mail account can be entered by clicking on the "Enter" button 348. The system will then use the information to automatically retrieve e-mail according to the system settings.

FIG. 11 illustrates the operation of the automatic cookie management module 100. A window 350 includes a listing of the current identity, the current cookie set and the current search history corresponding to the current identity. Each identity has its own cookie set and its own search history which is stored in the multiple identity database module 110 by the automatic cookie management module 100. The system allows the operator to select the current identity and operate the browser as any normal browser. As the operator moves from site to site, cookies are stored from those different sites to the client computer 35 and a search history is generated. The cookies can be allowed to be stored, can be erased or blocked as is allowed for most web browsers. Once the operator decides to change identities, the automatic cookie management module stores the current cookie set and the current search history in the multiple identity database module and links it to the current identity name for later use with the current identity. The automatic cookie management module 100 copies the cookie set and the current search history for the new chosen identity name from the multiple identity database module 110 and sets the current identity, the current cookie set and the current search history to the identity, the cookie data set and the search history for the new chosen identity. The operator now moves from site to site on the Internet under a different identity unknown to the sites previously visited by the first identity. Furthermore, the newly chosen identity has its own search history and its own cookie set causing it to have an entirely different reputation than the first identity. Sites visited by the user can access only the cookie set of the current identity set by the automatic cookie management module 100.

Figure 12:
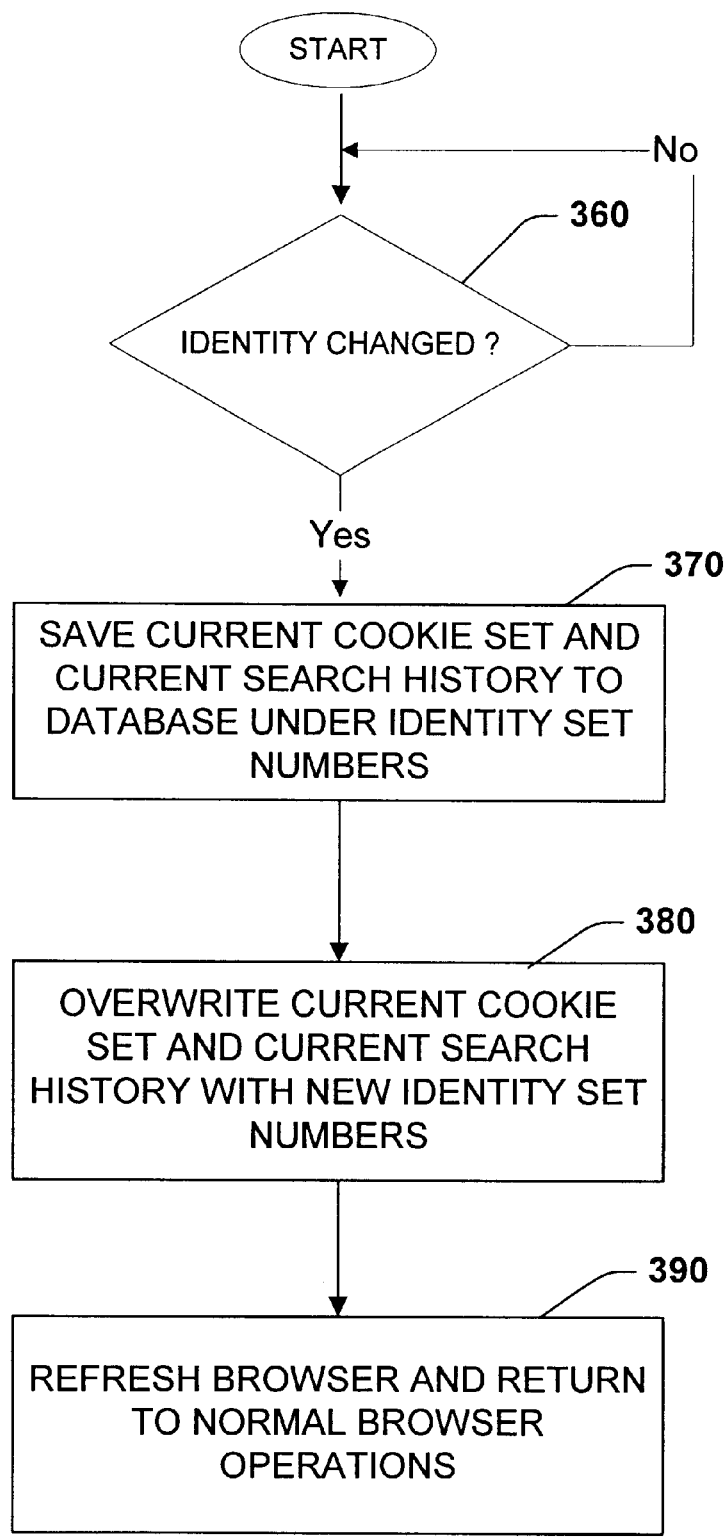
FIG. 12 illustrates a flow chart of one particular methodology of the operation of an automatic cookie management module in accordance with one aspect of the present invention.

FIG. 12 is a flow diagram illustrating one particular methodology for carrying out the present invention with respect to operation of the automatic cookie management module 100. In step 360, the the automatic cookie management module 100 monitors whether or not the Identity has changed. If not (NO), the automatic cookie management module 100 repeats step 360. If the identity has changed (YES), the automatic cookie management module 100 saves the current cookie set and current search history to the multiple database management module 110 under the identity set number in step 370. In step 380, the automatic cookie management module 100 overwrites the current cookie set and current search history with the new identity set. In step 390, the system refreshes the browser and the browser returns to normal operation.

Figure 13:
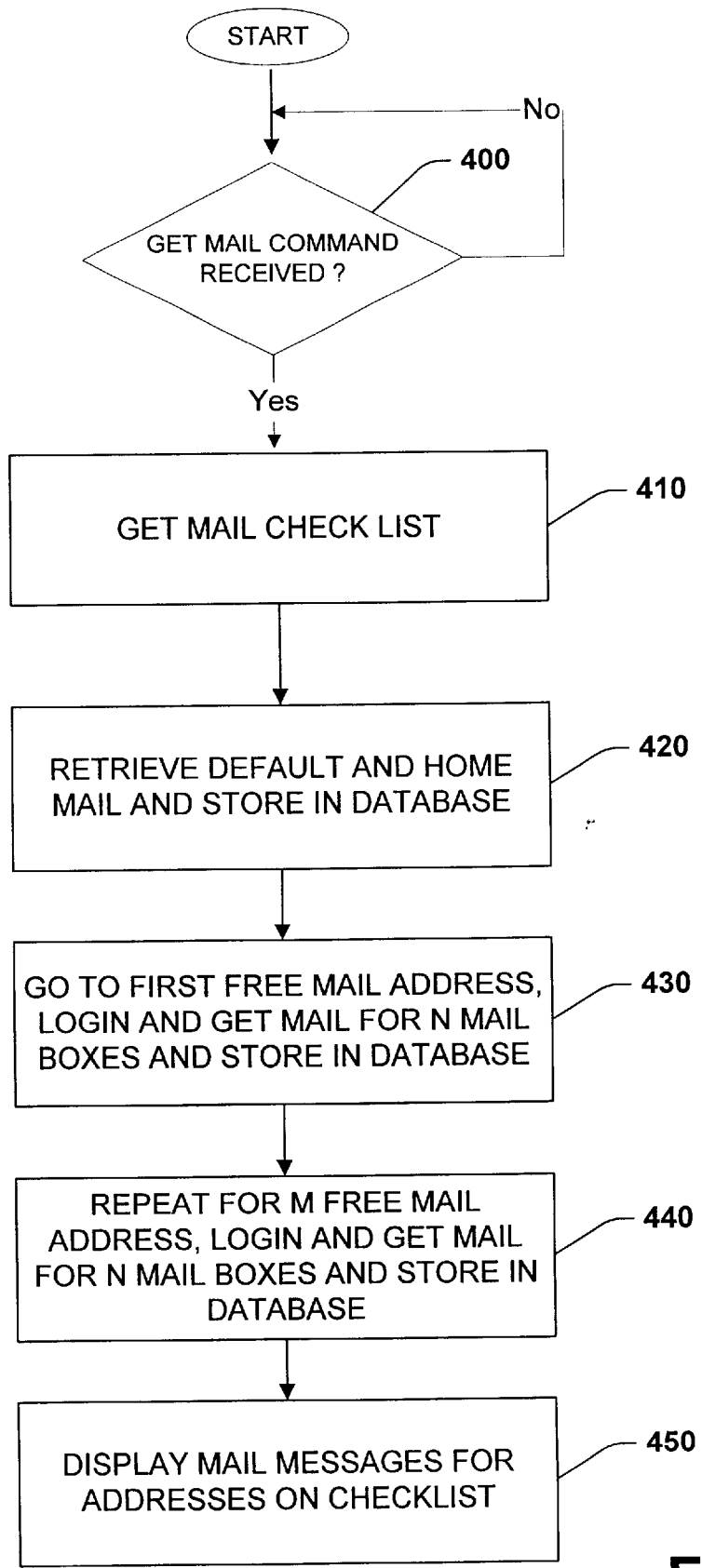
FIG. 13 illustrates a flow chart of one particular methodology of the operation of an e-mail receiving module in accordance with one aspect of the present invention.

FIG. 13 is a flow diagram illustrating one particular methodology for carrying out the present invention with respect to operation of the mail receiving module 120. In step 400, the mail receiving module 120 monitors whether or not the "Get Mail" command has been invoked. If no, the mail receiving module 120 repeats step 400. If yes, the mail receiving module 120 gets the mail check list in step 410. In step 420, the mail receiving module 120 retrieves the default and home address mail and stores it in the multiple database management module 110. In step 430, the mail receiving module 120 goes to the first free mail address on the mail check list then logs in and accesses the mail for every mail box on the list for that free mail address and stores the mail in the multiple database management module 110. In step 440, the mail receiving module 120 goes to all the other free mail address on the mail check list, then logs in and accesses the mail for every mail box on the list for those free mail address, then and stores the mail in the multiple database management module 110. In step 450, the mail receiving module 120 and/or the multiple identity browser displays the e-mail messages for all the addresses on the check list.

Figure 14:
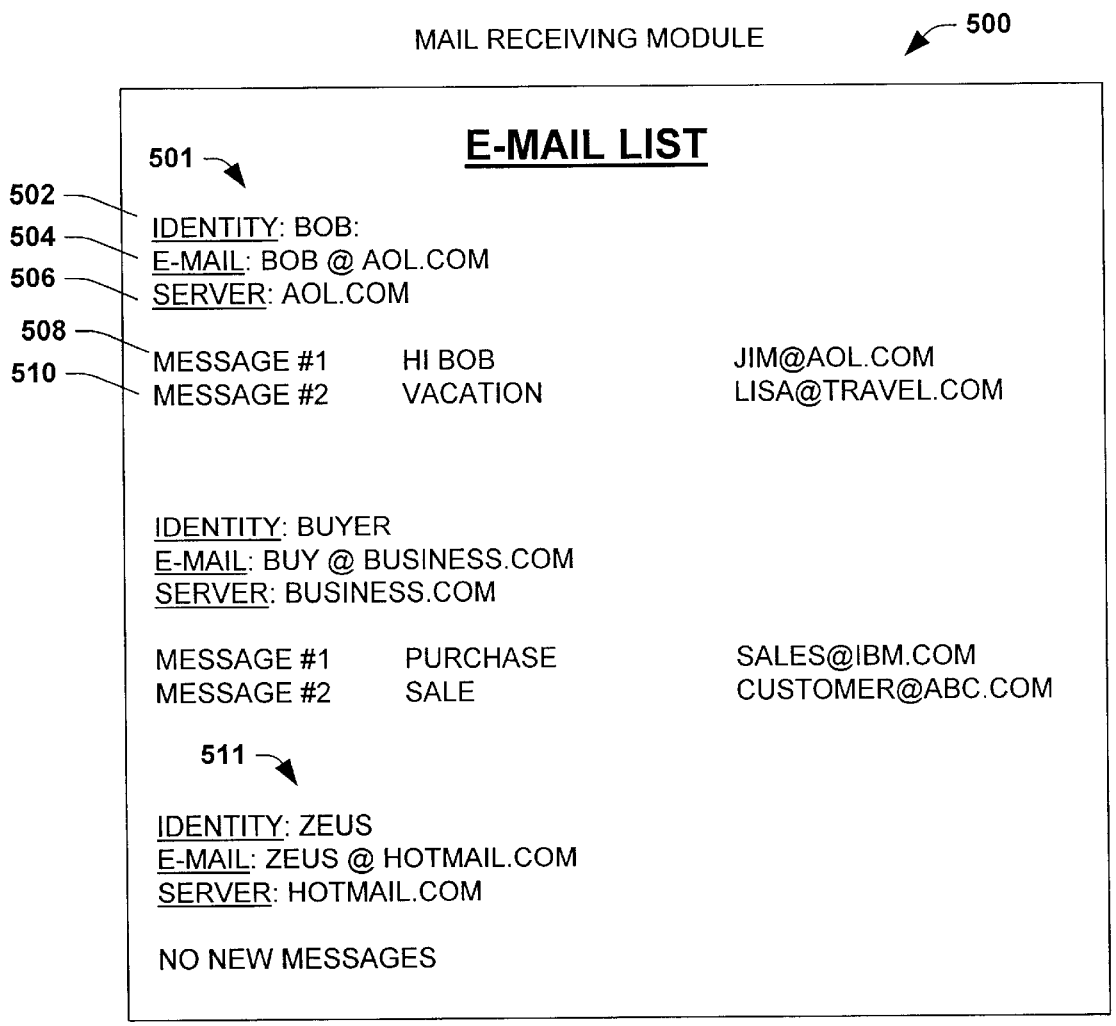
FIG. 14 illustrates an "E-mail List" screen in accordance with one aspect of the present invention.

Turning now to FIG. 14, in accordance with one example of an e-mail message list for multiple identities, an "E-Mail Message List" 500 is illustrated having a plurality of records. A first record 501 includes an identity name 502, an e-mail address 504, a server address 506 where the e-mail is received, a first mail message 508 and a second e-mail message 510. Each of the identities and e-mail addresses selected and displayed in the mail check list will have a record. In some cases, the record may not include any new messages. For example, the last record 511 illustrates the identity "Zeus" with the e-mail address "zeus @hotmail. com" residing on the server "hotmail.com" displaying the message "no new messages" printed below the identity name. It is to be appreciated that the "E-mail list" may omit printing record for e-mail messages in which no new messages have been received to facilitate the user in reviewing new e-mail messages under different identities.

In a preferred aspect of the present invention, the system includes a warning system that monitors the use of identities and provides the user with correct usages of identities in different sites and applications. The warning system can also inform a user if e-mail messages that are being sent have been sent by another identity, so that the integrity of each identity is maintained.

Figure 15A:
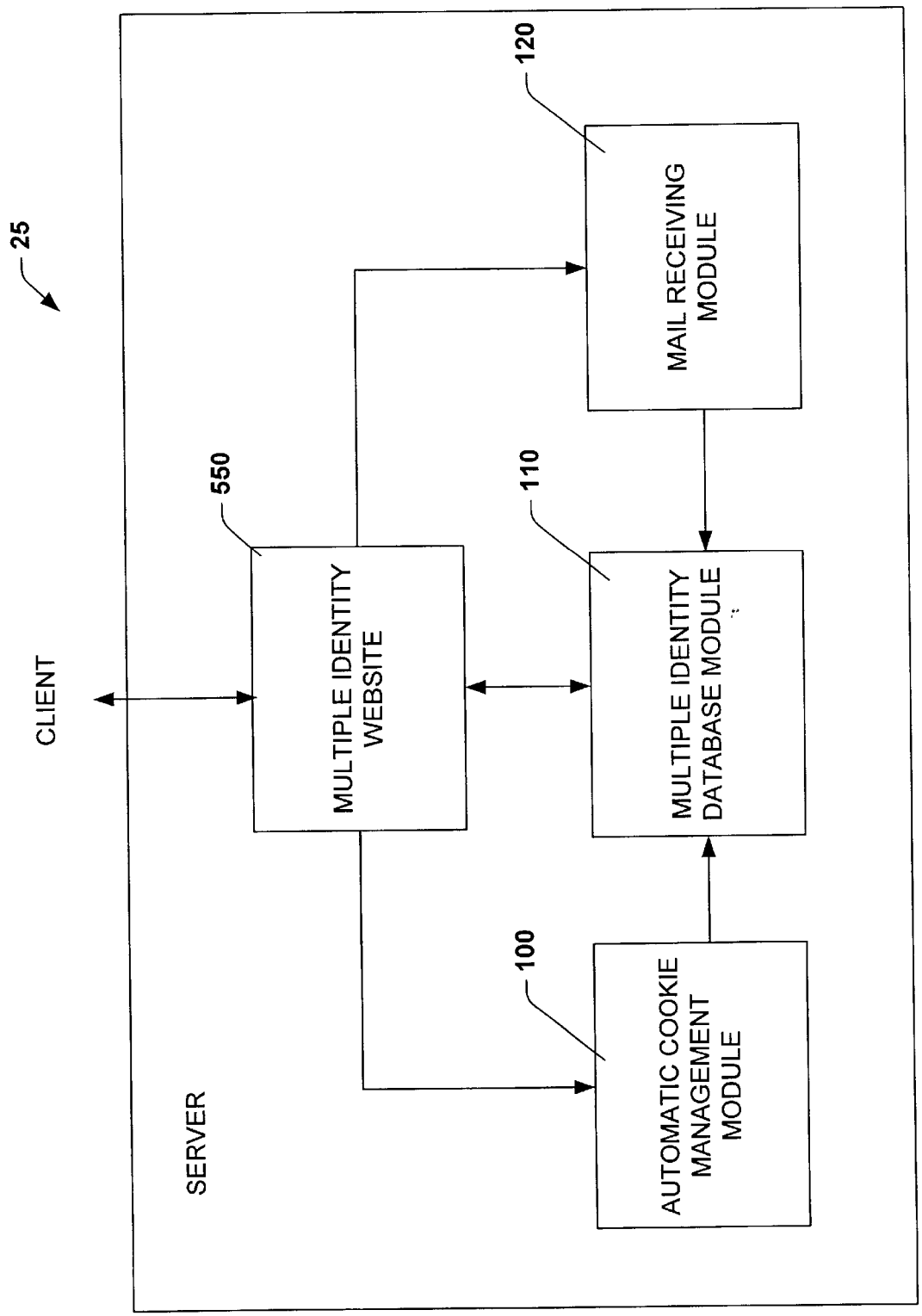
FIG. 15a is a schematic illustration of the present invention residing on a server in accordance with one aspect of the present invention.
Figure 15B:
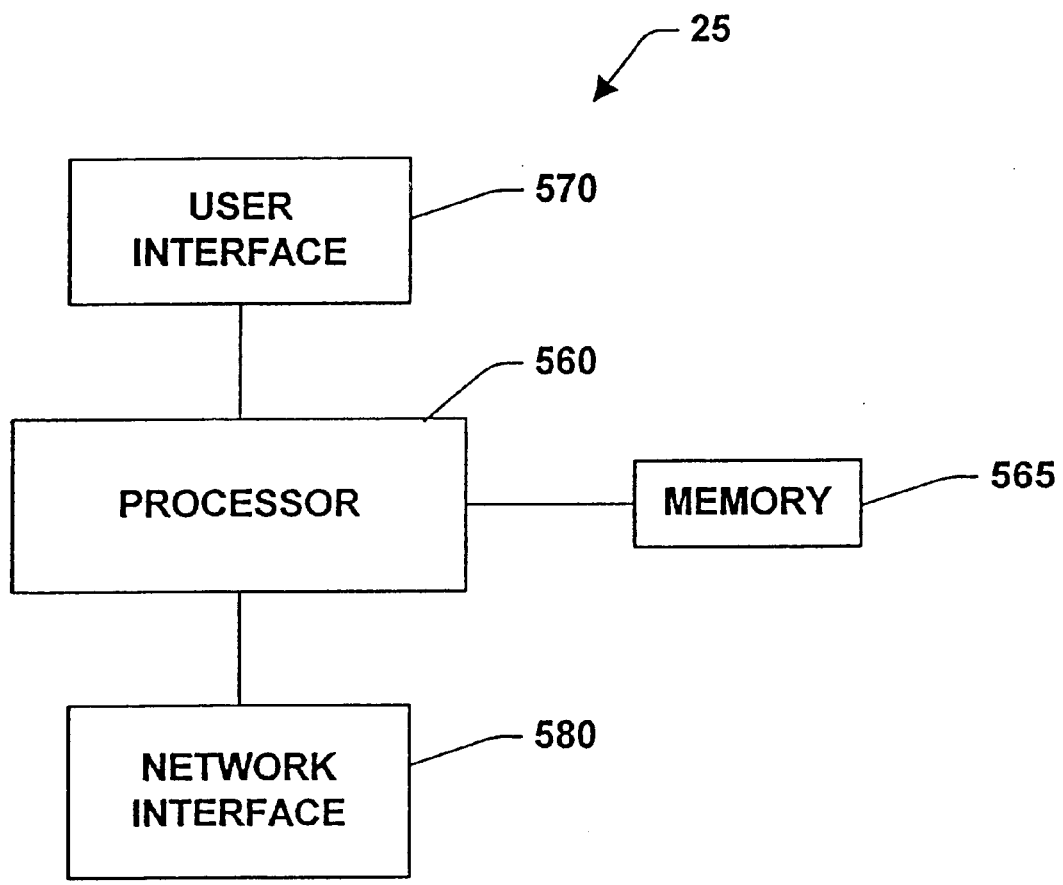
FIG. 15b illustrates a block diagram of a server in accordance with one aspect of the present invention.

FIG. 15a illustrates an alternate embodiment of the invention where the automatic cookie management module 100, the multiple identity database module 110 and the mail receiving module 120 reside on the server 25 as opposed to on a user's individual machine. In the alternate embodiment, the multiple identity browser can be replaced by a multiple identity web site 550. The operator can access their various identities through the web site and all identity and mail management can be maintained through the server. The current cookie set data and the current search history data can be downloaded to the client computer and any type browser can be utilized, while the user is moving from site to site under the current identity. A network browser (not shown) such as Netscape Navigator™ or Microsoft Internet Explorer™ may be used in at least one embodiment of the present invention. A block diagram of the server components is illustrated in FIG. 15b. The server 25 includes a central processor 560 for performing the various functions described herein. A memory 565 is coupled to the processor 560 and stores operating code and other data associated with the operations of the server 25. A user interface 570 is also coupled to the processor 560 and provides an interface through which the server 25 may be directly programmed or accessed. A network interface 580 coupled to the processor 560 provides multiple connections for transceiving information with various internet sites over network cables (not shown).

It is to be appreciated that any programming methodology and/or computer architecture suitable for carrying out the present invention may be employed and are intended to fall within the scope of the hereto appended claims.

The invention has been described with reference to the preferred embodiments. Obviously, modifications and alterations will occur to others upon reading and understanding the preceding detailed description. It is intended that the invention be construed as including all such modifications alterations, and equivalents thereof and is limited only by the scope of the following claims.

What is claimed is:

1. A system that provides a user with the ability to establish multiple identities while browsing on the Internet, the system comprising:

a multiple identity web browser module adapted to allow the user to establish multiple identities on a single client computer; and an automatic cookie management module adapted to manipulate a plurality of cookie data sets corresponding to a plurality of established identities and set a current cookie data set to correspond to a current identity, such that a web site visited by the user has access only to the current cookie data corresponding to the current identity, wherein the multiple identity web browser module is adapted to allow the user to add identities to the plurality of established identities, the system provides the user with a list of e-mail sites when establishing a new identity for providing an e-mail address that corresponds to the new identity, and the system automatically begins a sign up procedure for establishing an e-mail account corresponding to the new identity in response to the user selecting from amongst the list of e-mail sites.

2. A system that provides a user with the ability to establish multiple identities while browsing on the Internet, the system comprising:

a multiple identity web browser module adapted to allow the user to establish multiple identities on a single client computer; and an automatic cookie management module adapted to manipulate a plurality of cookie data sets corresponding to a plurality of established identities and set a current cookie data set to correspond to a current identity, such that a web site visited by the user has access only to the current cookie data corresponding to the current identity, wherein the multiple identity web browser module is adapted to allow the user to review a plurality of user names used at various web sites by at least one of the plurality of established identities.

3. The system of claim 2, wherein the multiple identity web browser module is adapted to allow the user to review an established history related to at least one of the plurality of user names used at various web sites by at least one of the plurality of established identities.

4. The system of claim 3, wherein the multiple identity web browser module is adapted to allow the user to add a user name and history to the plurality of user names used at various web sites by at least one of the plurality of established identities.

* * * * *